(12) United States Patent
Granström

(10) Patent No.: US 8,543,582 B1
(45) Date of Patent: Sep. 24, 2013

(54) UPDATEABLE METADATA FOR MEDIA CONTENT

(75) Inventor: Johan Georg Granström, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/218,615

(22) Filed: Aug. 26, 2011

(51) Int. Cl.
*G06F 7/00* (2006.01)
*G06F 17/30* (2006.01)

(52) U.S. Cl.
USPC ............ 707/748; 707/802; 705/319; 715/700

(58) Field of Classification Search
None
See application file for complete search history.

(56) References Cited

U.S. PATENT DOCUMENTS

| | | | |
|---|---|---|---|
| 6,993,534 B2 | 1/2006 | Denesuk et al. | |
| 7,010,526 B2 | 3/2006 | Denesuk et al. | |
| 7,467,164 B2* | 12/2008 | Marsh | 1/1 |
| 7,747,574 B1* | 6/2010 | Svendsen | 707/640 |
| 8,055,688 B2* | 11/2011 | Giblin | 707/804 |
| 8,103,614 B2* | 1/2012 | Tseng et al. | 706/62 |
| 2008/0114644 A1* | 5/2008 | Frank et al. | 705/14 |
| 2009/0143977 A1* | 6/2009 | Beletski et al. | 701/201 |
| 2010/0023549 A1* | 1/2010 | Choi et al. | 707/102 |
| 2010/0235408 A1* | 9/2010 | Nichols et al. | 707/805 |
| 2010/0274667 A1* | 10/2010 | Lanham et al. | 705/14.49 |
| 2011/0137855 A1* | 6/2011 | Shustef | 707/609 |
| 2011/0173214 A1 | 7/2011 | Karim | |
| 2011/0295851 A1 | 12/2011 | El-Saban et al. | |
| 2012/0046936 A1 | 2/2012 | Kandekar et al. | |
| 2012/0055221 A1* | 3/2012 | Chiu et al. | 72/333 |

OTHER PUBLICATIONS

"MusicBrainz Server", http://web.archive.org/web/20100328072117/http://musicbrainz.org/doc/MusicBrainz_Server.*
"Welcome to MusicBrainz!" http://web.archive.org/web/20100327194104/http://musicbrainz.org/.*
"Beginners Guide to Add Information", http://web.archive.org/web/20091125033330/http://musicbrainz.org/doc/Beginners_Guide/How_To_Add_Information.*
"Database",http://web.archive.org/web/20100413084407/http://musicbrainz.org/doc/Database.*
MusicBrainz—The Open Music Encyclopedia, http://musicbrainz.org, Last accessed Apr. 12, 2012.

* cited by examiner

*Primary Examiner* — Kimberly Wilson
*Assistant Examiner* — Susan F Rayyan
(74) *Attorney, Agent, or Firm* — Turocy & Watson, LLP

(57) ABSTRACT

The subject disclosure relates to leveraging input from media consumers of media content with no or unstructured metadata in order to provide accurate and relevant structured metadata for the media content. Thus, media content uploaded to a content server can be associated with a set of predetermined metadata tags that are intended to be relevant to the media content and to accurately describe the media content. These tags can be implemented as key-value pairs, in which either the keys or the values for a given key can be provided by users (e.g., consumers of the media content), and any such input can be assigned a confidence score in order to determine the "correct" value for a key.

28 Claims, 11 Drawing Sheets

UPDATEABLE METADATA FOR MEDIA CONTENT

TECHNICAL FIELD

The subject disclosure generally relates to providing updateable metadata for media content that can be updated or influenced by consumers of the media content.

BACKGROUND

Today, many systems and services exist in which users can upload media content such as video productions to a content server for other users to download and watch (e.g., consume). However, it is often the case that user-uploaded media content lacks structured metadata. Moreover, even were systems or services to define structured metadata for media content is extant, it is not certain that the user who uploads the media content will know the correct information or be inclined to provide that information.

The above-described deficiencies of today's techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiment, the disclosed subject matter can relate to an architecture that can associate metadata tags with archived content. In accordance therewith, the architecture can include an archive component that can receive media content from a content source and can store the media content to a content server configured to provide a content consumer access to the media content.

In addition, the architecture can include a tagging component that can select a set of tags that represent structured metadata that describe the media content. Typically, one or more tag from the set of tags can be implemented as a key-value pair with a key portion and a value portion. The tagging component can further associate the set of tags with the media content. Moreover, the architecture can include a population component that can update a tag from the set of tags based upon input received from the content consumer.

In one or more embodiments, the architecture can relate to a system that updates metadata tags associated with archived media. In particular, the architecture can include an interface component that can present a tag from a set of tags associated with media content and a receiving component that can receive a suggested value for the tag from a consumer of the media content. It is appreciated that the tag can be structured as a key-value pair with a key portion and a value portion. Moreover, the architecture can further include a vetting component that can determine a confidence score associated with an accuracy of the suggested value. In addition, the vetting component can present the suggested value and the confidence score, e.g., by way of a user interface employed to present the set of tags.

These and other embodiments are described in more detail below.

DETAILED DESCRIPTION

Overview

Figure 1:
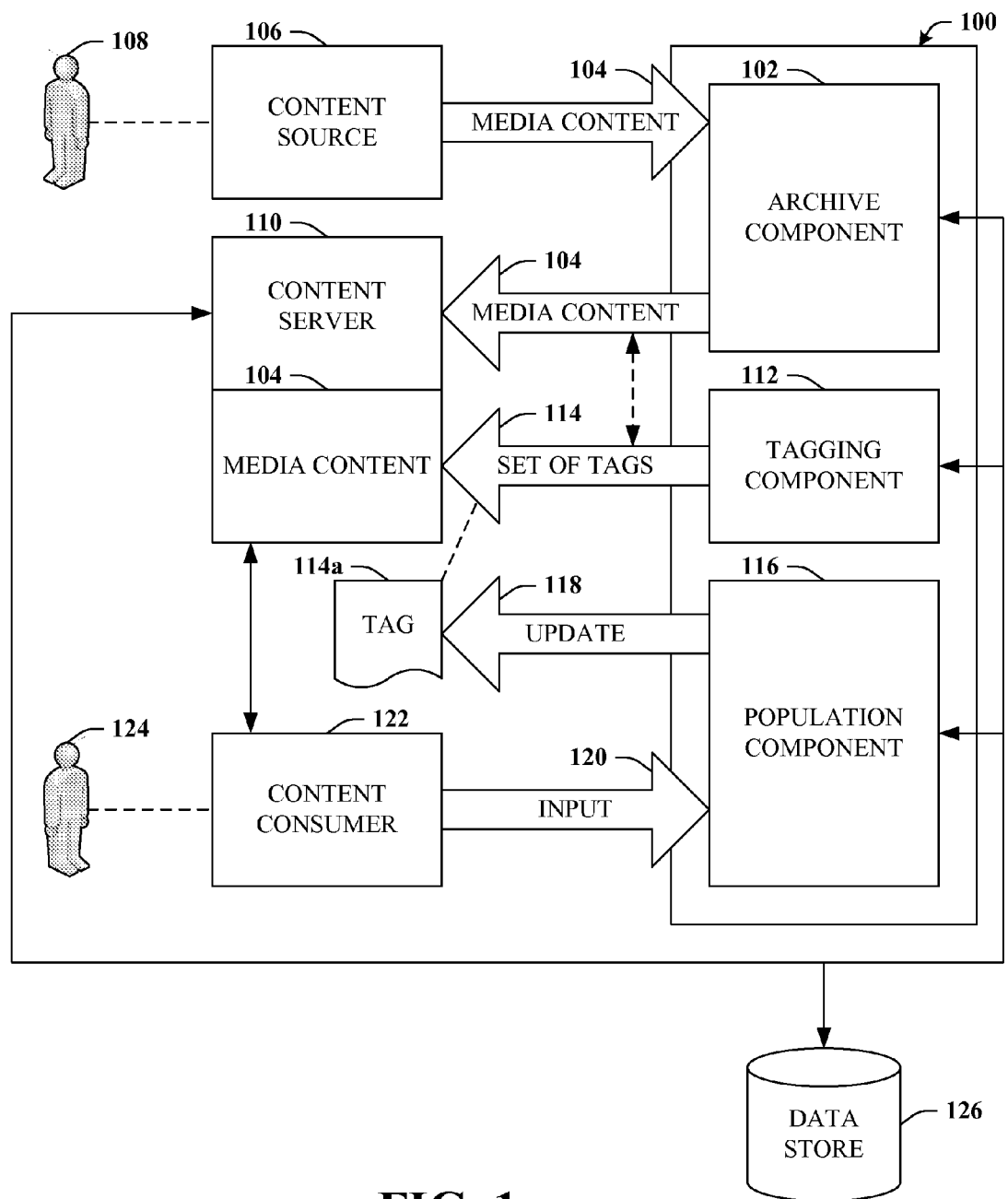
FIG. 1 illustrates a block diagram of an exemplary non-limiting system that can associate and/or update metadata tags with archived media content.

As noted in the Background section, it is often the case that user-uploaded media content lacks structured metadata about, e.g., place of recording, year of recording, conductor, orchestra, singer(s), and so on. Moreover, even if conventional systems provided a means for users who upload content to enter appropriate values, many cases would arise in which the users who upload the content simply do not know some or all of the desired information or may be in a hurry and neglect providing such information.

Regardless, the lack of such structured metadata can be frustrating for the consumer of the uploaded media content, when, e.g., the consumer wants to buy an associated recording related to the uploaded content, or when the consumers desire to compare the uploaded media content with other uploads. In many cases, especially when presentation of the media content is coupled with user comments, the information that the consumer is looking for might be available in an unstructured format such as, e.g., in the description of the upload, comments section, or the like. However, even when that is the case, this information can be very difficult to locate.

Accordingly, an objective of the disclosed subject matter is to provide a set of updateable metadata tags that are deemed to be relevant to the user/consumer of the media and can also leverage the knowledge base of users to provide accurate metadata descriptions that are structured for ready identification by users who desire such information. Generally, these tags will be implemented or structured as key-value pairs, with an associated key portion and an associated value portion. Hence, a tag with the data "Year: 1997" can be construed as a key portion of "Year:" and a value portion "1997"

For example, for a particular type or category of media content, a fixed set of tags can be provided for all media content uploaded for that type. For instance, for a classical music upload, the set of tags can include, e.g., a place of recording, a year of recording, the performing orchestra, the conductor, the album title, the International Standard Music Number (ISMN), the composer, particular soloists, and so forth. Similarly, for other types of media content, including other types of music uploads, this set of structured tags can differ.

Although the tags can be predefined in a structured manner, the actual structure can change through a vetting process that can be largely tied to the desires of the consumers. In other words, new tags can be suggested, e.g., tags that users find important either generally with respect to all media, or more specifically e.g., with respect to a particular category (or another subset) of media content, or with respect to the specific media content alone. Similarly, the actual values of these tags (e.g., the value portion of a key-value pair) can be updated in a similar manner: via input from consumers. Moreover, a confidence score can be applied to inputs by consumers, which can reinforce or dispute existing data, and which can be reinforced or disputed by other consumer inputs. Typically, however, the values that have the highest confidence scores, which can be determined from aggregate input from consumers, can be displayed as the "correct" values.

User input can be received either from interaction with the displayed metadata or by analysis of unstructured input from one or more users. For example, a media item with associated user comments section can be analyzed and relevant data can be extracted there from. Moreover, aggregate input from users can be analyzed to construct confidence scores based upon a purely democratic model in which all user input is given identical weight. In another embodiment, aggregate input from users can be analyzed based upon a specialist model in which, for a variety of possible reasons, some users can be accorded a greater weight than other users.

Non-Limiting Examples of Associating and Updating Tags

Referring now to the drawings, with reference initially to FIG. 1, system 100 that can associate and/or update metadata tags with archived media content is depicted. Generally, system 100 can include a memory that stores computer executable components and a processor that executes computer executable components stored in the memory, examples of which can be found with reference to FIG. 11. In addition, system 100 can include archive component 102 that can receive media content 104 from a content source 106. Media content 104 can be, e.g., a video or another type of audio-visual material. Moreover, content source 106 can be a computing device (e.g., a computer, laptop, smart phone, etc.) associated with user 108. Thus, user 108 can be an author or curator of media content 104 who uploads media content to system 100 to enable consumption of media content 104. Hence, media content 104 that is received by archive component 102 will typically be user-uploaded media content that is uploaded by way of a computer network, via either a wide area network such as the Internet or a mobile network, a local area network, or another suitable type of network.

Furthermore, archive component 102 can store media content 104 to content server 110. Thus, as depicted, media content 104, as well as other items of content and other data (not shown), can be included in content server 110. Content server 110 can be configured to provide content consumer 122 access to media content. Content consumer 122 can be a computing device that downloads or otherwise receives media content 104. Hence, content consumer 122 can present media content 104 via a suitable display or output mechanism, which can be observed and/or managed by an associated user (e.g., user 124).

In addition, system 100 can include tagging component 112 that can select set of tags 114. In particular, set of tags 114 can represent structured metadata that describes media content 104. Typically, a given tag (e.g., tag 114a) from set of tags 114 can be implemented as a key-value pair with a key portion and a value portion, which is further detailed infra. Furthermore, tagging component 112 can associate set of tags 114 with media content 104, in which tags included in set of tags 114 can be updateable. Thus, media content 104 as well as the associated set of tags 114 can be included in content server 110, although such is not strictly necessary provided that set of tags 114 is associated with media content 104 in another manner. As a non-limiting example, the key portion of one or more tags included in set of tags 114 can define or relate to a feature associated with media content 104 that is determined to be relevant to users, e.g., user(s) 108 or user(s) 124. Likewise, the value portion of one or more tag included in the set of tags can relate to an updateable suggested value for the key portion. For example, information to identify a particular version of media content 104, a particular concert, show, venue, time, date, performers, and so forth can be described by set of tags 114 in terms of key-value pairs.

Moreover, system 100 can further include population component 116 that can update tag 114a from set of tags 114 by way of update 118. Update 118 can be based upon input 120 received from content consumer 122. For example, content consumer 122, e.g., after displaying or otherwise consuming media content 104, can provide feedback in the form of input 120 based upon knowledge and/or experiences of user 124. Thus, the so-called "wisdom of the crowd" can be leveraged to provide pertinent and accurate metadata for media content 104 that might otherwise lack such structured metadata.

It is appreciated set of tags 114 as well as other data can be stored in data store 126. Data store 126 is intended to be a repository of all or portions of data, data sets, or information described herein or otherwise suitable for use with the claimed subject matter. Data store 126 can include all or a portion of various sets of tags 114, all or a portion of various updates 118 or a history thereof, all or a portion of input 120 or a history thereof and so forth. Moreover, data store 126 can also include all or a portion of the underlying video items or other media content 110 stored on content server 110. Hence, data store 126 can be or can include content server 110. Regardless, data store 126 can be centralized, either remotely or locally cached, or distributed, potentially across multiple devices and/or schemas. Furthermore, data store 126 can be embodied as substantially any type of memory, including but not limited to volatile or non-volatile, solid state, sequential access, structured access, random access and so on. It should be understood that all or portions of data store 126 can be included in system 100, or can reside in part or entirely remotely from system 100. It should also be understood that system 100 can be a component of content server 110 that offers a media content service to users, including but not limited to both upload of, and access to, stored content.

To provide a concrete illustration, consider the following non-limiting scenario. Consider the case in which media content 104 is a video of a concert in which a famous cellist is performing Bach's Cello Suite No. 1 in G Major: I Prelude. The video (e.g., media content 104) can be an authorized recording by user 108, who concurrently or later uses his home computer or his smart phone (e.g., content source 106) to upload the video to archive component 102. Archive component 102 can receive and store the video to content server 110, where the video can be accessed and/or consumed by other users (e.g., one or more user 124) via associated devices (e.g., one or more content consumer 122). In this case, suppose user 124 knows the title, composer, performer, or other relevant features associated with the video, some or all of which might not have been known or for some other reason not included by user 108 when uploading. In fact, in some cases, such data or associated values might be incorrect when user 108 uploads the video. Regardless, content consumer 122 can provide such information by way of input 120, which population component 116 can utilize to effectuate a suitable update (e.g., update 118) to one or more of the tags (e.g., updateable metadata) included in set of tags 114. These and other features will become more apparent with reference FIG. 2, which can be examined alongside FIG. 1 for illustration of additional features, context, or understanding.

Figure 2:
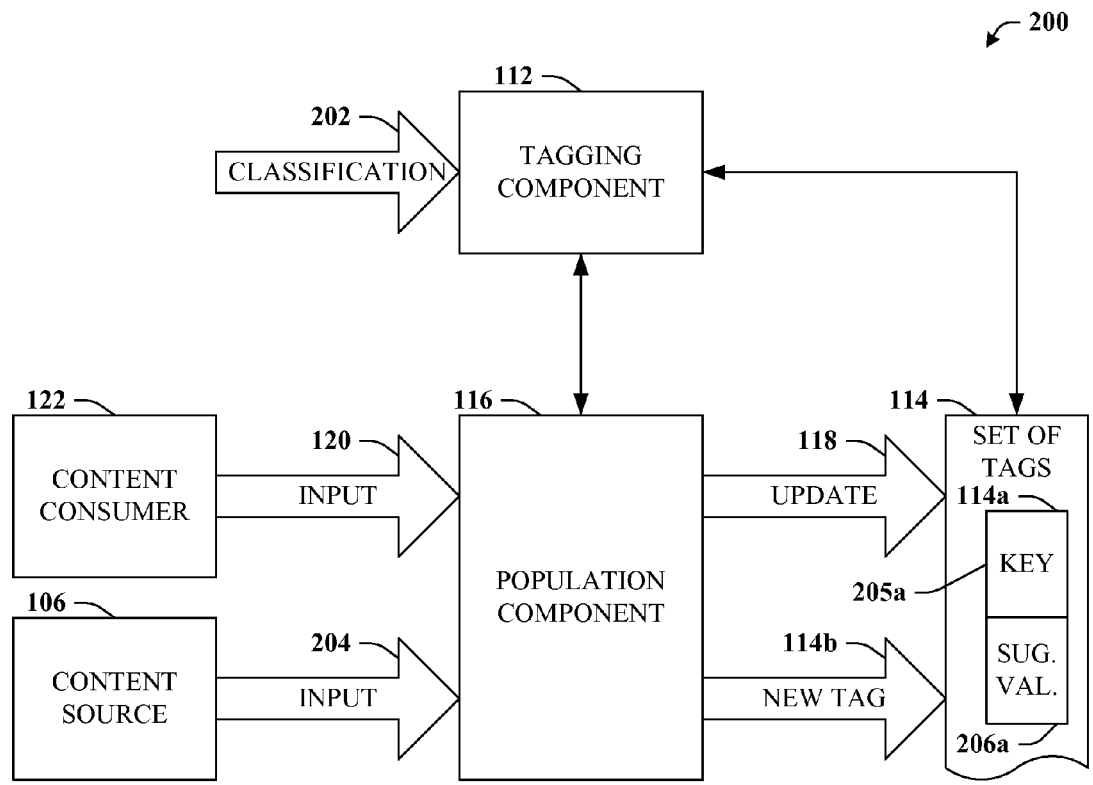
FIG. 2 illustrates a block diagram of an exemplary non-limiting system that can provide additional aspects or features in connection with updating metadata tags.

Turning now to FIG. 2, system 200 that can provide additional aspects or features in connection with updating metadata tags is illustrated. System 200 can include tagging component that can select set of tags 114 and associate set of tags 114 with media content 104 as substantially described supra in connection with FIG. 1. Furthermore, system 200 can include population component 116 that can update a given tag (e.g., tag 114a) from set of tags 114 based upon input 120 received from content consumer 122, which was also introduced in connection with FIG. 1.

In addition to what has been described previously, in one or more aspect of the disclosed subject matter, tagging component 112 can select set of tags 114 based upon classification 202 of media content 104. For example, media content 104 relating to a musical performance might be classified differently than, say, media content 104 relating to an instructional video. In particular, consumers of either might place value on different metadata relating to the underlying content. Accordingly, the set of tags 114 selected by tagging component 112 can be different in both cases, yet in both cases can be selected appropriately. As another example, classification 202 can relate not only to different types of media content, but also to specific sub-categories. For instance, users might find value in a different set of tags 114 depending upon whether the subject matter of media content 104 is classical music or pop music.

Furthermore, in one or more aspect, population component 116 can update (e.g., via update 118) set of tags 114 further based upon input 204 received from content source 106. Thus, while tags are typically updateable based upon input 120 from content consumers 122, some or all data included in the tags can be provided by content source 106. As a first non-limiting example, content source 106 can receive suitable data from user 108 either before, during, or after an associated upload of media content 104. As a second non-limiting example, content source 106 can automatically provide certain data such as a time stamp or a location (e.g., if equipped with Global Positioning System (GPS) or another location-based service and consented to by user 108). Time stamps or location can provide information that is suitable for certain tags, for example tags with keys associated with, e.g., "a date of performance" or "a venue" or the like. Moreover, values for such keys, when provided via GPS or the like can be given a very high confidence score in terms of accuracy, which is further detailed herein.

In one or more aspect, population component 116 can add a new tag (e.g., new tag 114b) to set of tags 114 based upon input 120 received from content consumer 122. New tag 114b can be substantially similar to existing tags included in set of tags 114. Thus, just as example tag 114a can include a key-value pair, namely key 205a and suggested value 206a, new tag 114b can as well. It is understood that in the event that new tag 114b is suggested without input for an associated suggested value, then the suggested value can be initially blank or null. For instance, suppose user 124 associated with content consumer 122 provided input 120 that indicated it would be very useful for users if media content 104 also included a tag associated with a contact for a user 108 associated with content source 106. In that case, input 120 might suggest a key value (e.g., similar to key 205a) for new tag 114b indicative of "contact:". Such information can be readily provided by user 108, but might initially be left blank by user 124. Additionally or alternatively, information associated with new tag 114b can be received by way of input 204 from content source 106. In one or more aspect, population component 116 can update (e.g., by way of update 118) a suggested value (e.g., suggested value 206a) associated with tag 114a based upon input 120 received from content consumer 122 or based upon input 204 received from content source 106. It is understood that suggested values as well as other input 120, 204 received can undergo analysis to, e.g., determine a confidence metric or score associated with the data, which is further detailed in the following section.

Non-Limiting Examples of Confidence Scoring in Connection with Tag Updates

Figure 3:
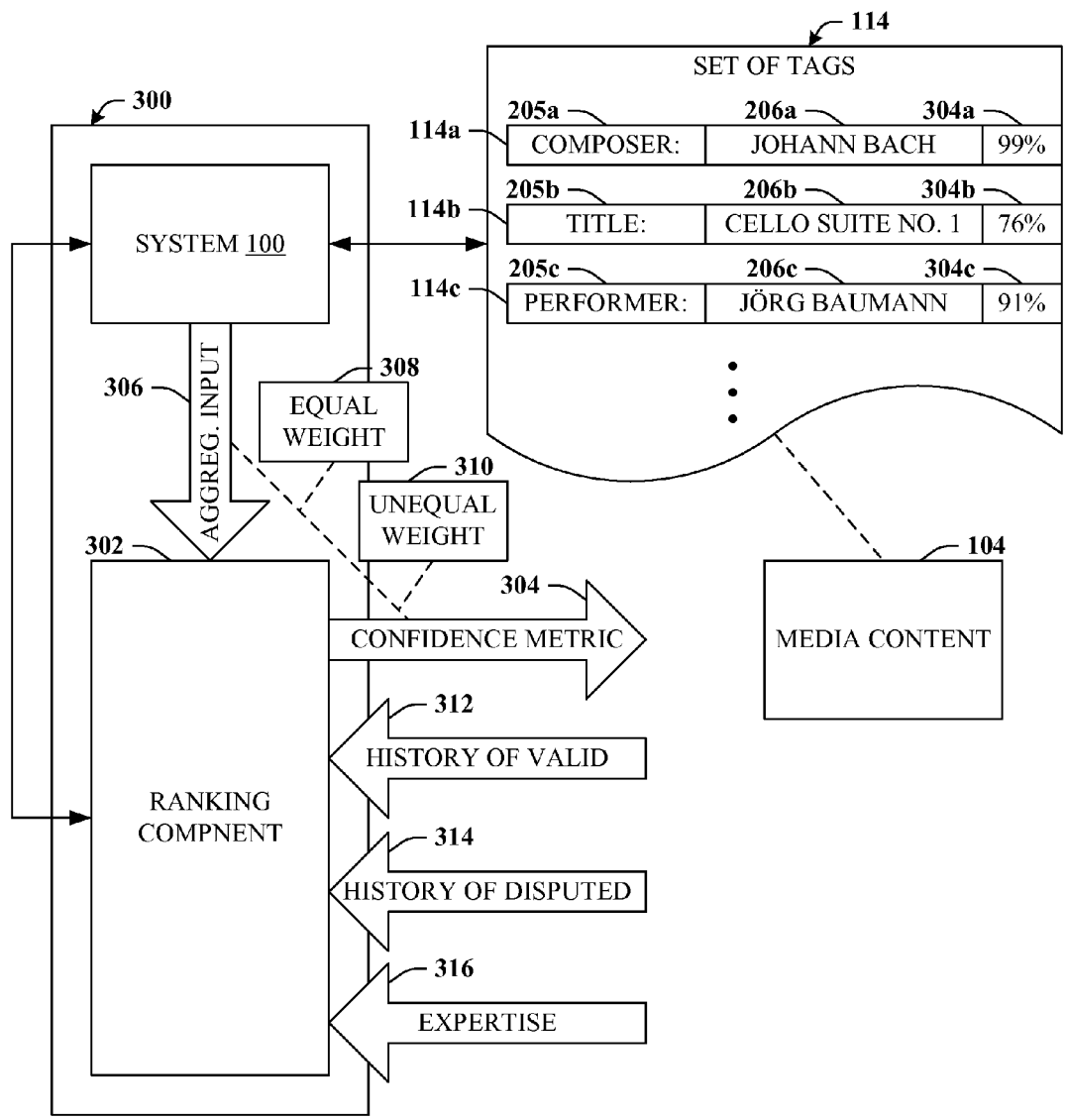
FIG. 3 illustrates a block diagram of an exemplary non-limiting system that can provide confidence measures associated with user updates to updateable metadata.

With reference now to FIG. 3, system 300 that can provide confidence measures associated with user updates to updateable metadata is depicted. For example, system 300 can include all or portions of system 100 detailed in connection with FIGS. 1 and 2. In particular, system 300 can include components to receive, create, update, and/or maintain one or more set of tags 114 associated with a particular item of media content 104. As illustrated, the example scenario is that introduced above relating to a recording of a Bach concert that represents media content 104. In this non-limiting example case, the Bach concert video has associated therewith set of tags 114, identified as tags 114a-114c. This set of tags 114 includes various keys, identified individually as composer (e.g., key 205a), title (e.g., key 205b), and performer (e.g., key 205c). It is appreciated that other tags can exist as well. These keys 205a-c can be related to associated updateable values, denoted here as suggested values 206a-c. It is understood that suggested values can be based upon user input.

In addition, system 300 can include ranking component 302 that can determine confidence metric 304 associated with an accuracy of the suggested values based upon an analysis of aggregate input 306 from multiple content consumers (e.g., content consumer 122) or from content source 106. Hence, aggregate input 306 can be an aggregation of input 120 and input 204. Thus, for example, consider once more the scenario in which a video relating to a Bach composition is uploaded to a content server. The content source 106 indicates that the "performer" (e.g., key 205c) is "Jörg Baumann" (e.g., suggested value 206c), so that value can be assigned to the associated key of the tag for the video at or near the time of upload. Furthermore, consider the case in which another user who watches the video disputes the current suggested value 206c, believing the performer is instead Yo-Yo Ma, and consequently submits such data by way of input 120. However, several more users also weigh in on the dispute, all of whom agree with the content source that the performer in the underlying video is Jörg Baumann.

In this case, aggregate input 306 can include the numerous inputs from users (including both consumers and the source) indicating suggested value 206c is Jörg Baumann, as well as the lone input from one particular user who suggested value 206c should be Yo-Yo Ma. Thus, ranking component 302 can determine a respective confidence metric 304 for both suggested values 206c. In this example case, ranking component 302 has indicated that the confidence metric for "Jörg Baumann" (suggested value 206c) is 91% based upon aggregate input 306. Such is indicated by confidence metric 304c. It is appreciated that other suggested values for the same key 205c (e.g., "Yo-Yo Ma") can be assigned a confidence metric 304 as well as for other keys (e.g., keys 205a and 205b), the latter of which is illustrated by confidence metrics 304a and 304b. It should be appreciated that confidence metrics can be included in tags 114 as depicted or can reside separate from the actual associated tags 114.

In one or more aspect, ranking component 302 can determine confidence metric 304 based upon equal weighting of respective input (e.g., inputs 120, 204) from multiple content consumers (e.g., content consumers 122) as well as the content source 106, which is depicted by reference numeral 308. Moreover, in one or more aspect, ranking component 302 can determine confidence metric 304 based upon unequal weighting (denoted by reference numeral 310) of respective input from multiple content consumers, potentially including the content source 106 as well.

Furthermore, in one or more aspect of the disclosed subject matter, and particularly for cases in which an unequal weighting is applied, ranking component 302 can increase a vote weight associated with content consumer 122 based upon history 312 of validated input. In other words, if a particular user 124 and/or content consumer 122 has historically suggested values that have resulted in "correct" or highly scored confidence scores or metrics, or suggested values that are not or only rarely disputed, then subsequent suggested values can be deemed to have greater weight than otherwise. In contrast, in one or more aspect, ranking component 302 can decrease a vote weight associated with content consumer 122 based upon history 314 of disputed input. Thus, if a particular user 124 and/or content consumer 122 has a tendency to suggest values or agree with suggested values that are commonly disputed or often deemed to be "incorrect" or carry a lower confidence score or metric, then that particular user can command a lower weighting for inputs. As another example, content source 106 can be provided a higher weight by default than content consumer 122, indicative of the expectation that a source of uploaded media content 104 will, on average, be more knowledgeable about media content 104.

In one or more aspect of the disclosed subject matter, ranking component 302 can increase a vote weight associated with content consumer 122 based upon relevant expertise or decrease the vote weight based upon a lack of expertise. For example, a particular user (and/or associated content consumer 122) might be known to have exceptional domain-specific expertise and/or first-hand knowledge of a particular element associated with media content 104. Such can be determined in a variety of ways, including based upon available certifications, transaction histories, perhaps in connection with disparate systems, geography, demographics, consistent accuracy in voting, and so forth. Regardless, establishing certain relevant expertise can result in increasing to some degree (which can be variable) the weight of associated input 120, while demonstrating a lack of expertise can yield an opposite effect.

Figure 4:
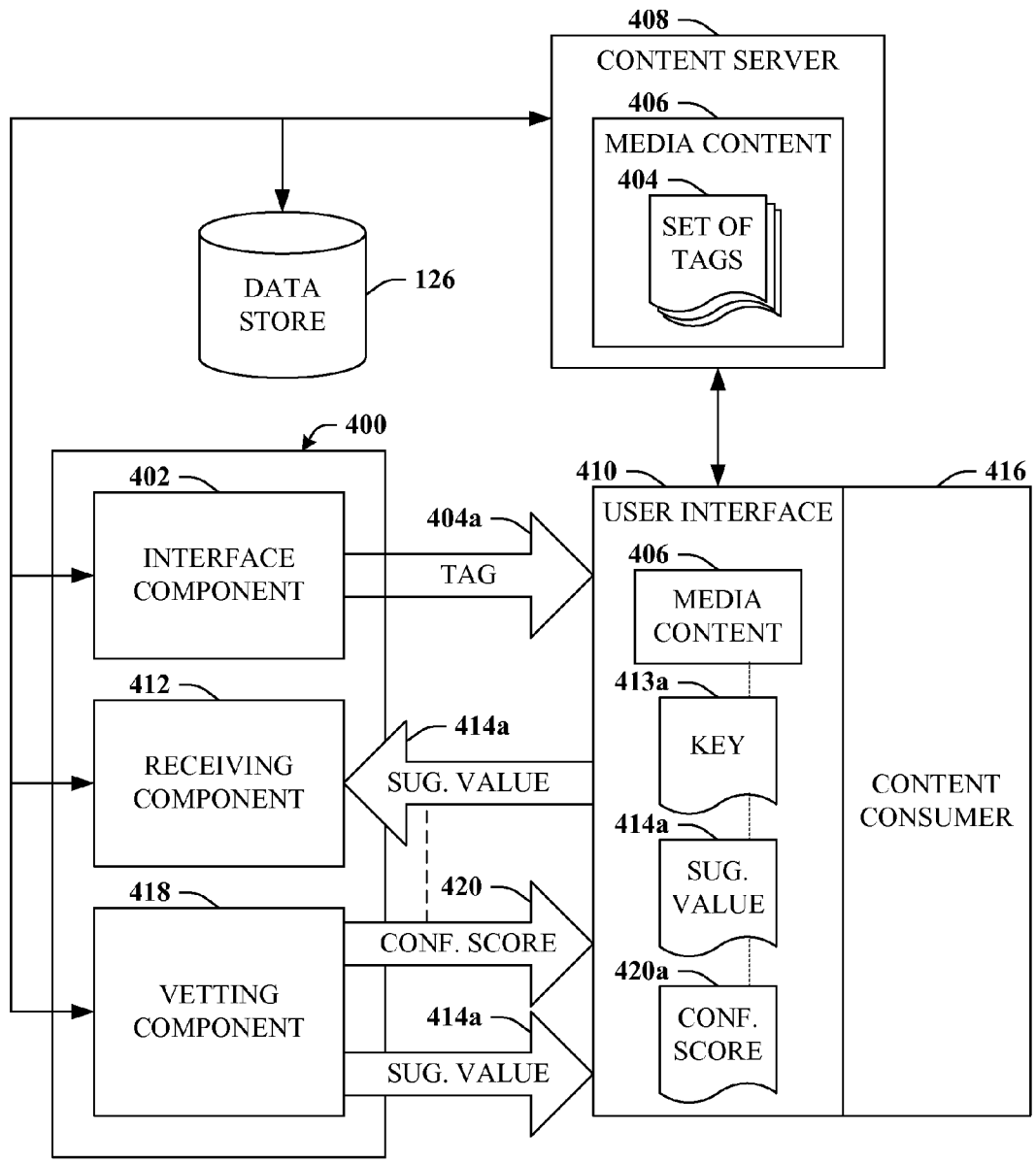
FIG. 4 illustrates a block diagram of an exemplary non-limiting system that can present and update metadata tags associated with archived media.

Non-Limiting Examples of Presenting Tags to a User Interface and Receiving Suggestions Via the User Interface Referring now to FIG. 4, system 400 that can present and update metadata tags associated with archived media is provided. As with other subject matter described herein, system 400 can include a memory that stores computer executable components and a processor that executes computer executable components stored in the memory, non-limiting examples of which can be found with reference to FIG. 11. Generally, system 400 can include interface component 402 that can present tag 404a from set of tags 404 associated with media content 406. It is appreciated that other tags included in set of tags 404, if any, can be presented as well. Typically, tag 404a will be implemented as a key-value pair with a key portion (e.g., key 413a) and a value portion (e.g., suggested value 414a). Media content 406 can be stored in content server 408 that allows users to upload and download various media items such as media content 406, any of which can have associated therewith a respective set of tags 404. Moreover, all or a portion of tags 404 associated with a particular item of media content 406 can be presented by interface component 402 to user interface 410 that can be associated with an application (e.g., a browser) or hardware (e.g., a display) of content consumer 416, which can be a computing device associated with a user. It is understood that content consumer can communicate with one or both content server 408 or system 400 by way of the Internet or another data communications network. Furthermore, system 400 or components thereof as well as other suitable components described herein can be coupled to or included in content server 408, which likewise can constitute all or a portion of data store 126.

In addition, system 400 can include receiving component 412 that can receive suggested value 414a for key 413a of tag 404a from content consumer 416 that retrieves and/or consumes media content 406. Thus, suggested value 414a can be received by way of user interface 410. System 400 can also include vetting component 418 that can determine confidence score 420 associated with an accuracy of suggested value 414a. In addition, vetting component 418 can also present suggested value 414a and the associated confidence score 420a, which can be presented to user interface 410, either directly or by way of interface component 402. Accordingly, set of tags 404 can operate as a updateable metadata that can be tailored or structured specifically for media content 406 or an associated media class. Set of tags 404 can be updated based upon input from users, with those inputs being vetted and scored by various confidence means or mechanisms.

Figure 5:
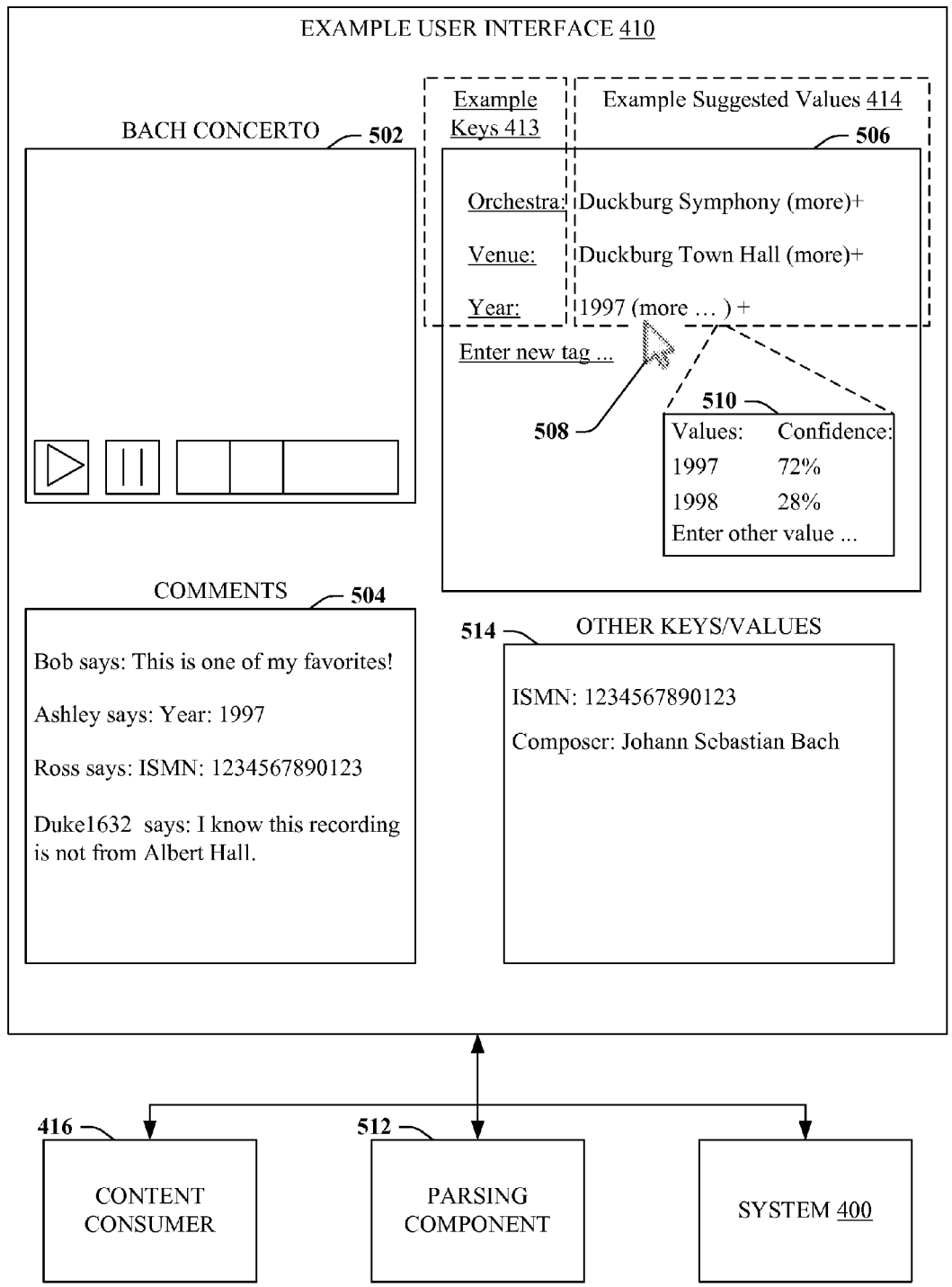
FIG. 5 illustrates a block diagram of an exemplary non-limiting system that can provide a non-limiting example user interface and associated components.

While still referring to FIG. 4, but turning now as well to FIG. 5, system 500 that can provide a non-limiting example user interface 410 is depicted. As illustrated, user interface 410 can present media content 406, which is denoted by reference numeral 502. Again following the familiar example of a Bach concerto, user interface 410 can provide various controls (e.g., play, pause, progression slider . . . ) to manage or manipulate a presentation of the Bach concerto. In addition, user interface 410 can present user comments associated with media content 406, which is illustrated by listing of comments 504. Thus, it is understood that interface component 402 can present both media content 406 (e.g., reference numeral 502) and listing of comments 504 associated with media content 406.

In addition, user interface 410 can provide view of structured metadata 506, which can include the various tags 404 with associated keys 413 and suggested values 414 for those keys. In this example, three keys (and associated suggested values) are provided relating to the Orchestra that is performing the Bach concerto, the venue in which the performance takes place and the year of the performance. The respective suggested values for these keys are: "Duckburg Symphony", "Duckburg Town Hall", and "1997".

In one or more aspect of the disclosed subject matter, interface component 402 can present (e.g., to user interface 410) a first suggested value associated with a highest confidence score 420. Thus, the respective suggested values 414 presented can be those that have the highest associated confidence score 420 (e.g., "Duckburg Symphony", "Duckburg Town Hall", and "1997"). Moreover, receiving component 412 can receive a suggested value 414 in response to a selection of metadata included in user interface 410. By way of illustration and not limitation, cursor 508 is depicted hovering over the metadata indicating "Year: 1997". By virtue of, e.g., an associated mouse-click or another selection, a user can be presented with an input box (not shown). Such an input box can enable the user to vote to agree with the current suggested value (in this case "1997"), dispute the suggested value, or provide a different, competing suggested value.

In one or more aspect, interface component 402 can present to user interface 410 at least one additional suggested value associated with at least one lower confidence score 420. Thus, by virtue of a selection or hovering over a particular user interface element, additional metadata can be displayed, which is illustrated by output 510. In this non-limiting example, output 510 indicates that the "1997" suggested value 414 has a 72% confidence score 420 (which can be derived based upon aggregate input from users), while a competing "1998" suggested value 414 has a confidence score 420 of "28%".

In accordance with one or more aspect, interface component 402 can present to user interface 410 the at least one additional suggested value 414 in connection with an expandable or collapsible user interface element. Thus, as illustrated, the suggested values 414 or other metadata can include a user interface element such as a "more . . ." element or a "+" or "−" symbol to name but a few that upon an associated selection or hover by cursor 508, can invoke additional output such as that described by output 510.

Moreover, in one or more aspect, receiving component 412 can further receive (e.g., from user interface 410) a suggested tag that is recommended to be included in the set of tags 404. It is appreciated that tags included in set of tags 404 can be a key-value pair that include a key portion and a value portion and are generally intended to represent structured metadata for media content 406. The key portion of a tag is generally intended to relate to a feature associated with media content 406 that is determined relevant to a user. Thus, users can suggest new tags to be included in set of tags 404. In this example, such can be accomplished by selecting the "Enter new tag . . ." element included in user interface 410, although any suitable means can be employed. Likewise, the value portion of a tag that is presented to user interface 410 is typically the suggested value with the highest confidence score, although it is appreciated that other suggested values can be provided (potentially along with associated confidence scores), e.g., by way of output 510.

Accordingly, the above describes features associated with receiving suggested values 414 from interacting with metadata or other elements of user interface 410. However, other ways of identifying and/or receiving such data can be achieved. For example, such information can be extracted from other suitable data associated with users or user interface 410.

In particular, one or more of systems 400 or 500 can include parsing component 512 that can extract one or more suggested value 414 from listing of comments 504. For example, while many of the individual comments included in listing of comments 504 will be arbitrary or irrelevant to one or more tags from set of tags 404, some might be relevant. For instance, the first comment from a user identified as "Bob" might be deemed irrelevant to set of tags 404. However, Ashley's comment states, "Year: 1997" which can be determined or inferred to be an indication that user Ashley believes the recording of media content 406 was from 1997. Likewise, Ross states, "ISMN: 1234567890123" which can be determined or inferred to indicate Ross believes the International Standard Music Number (ISMN) is "1234567890123" which might represent a relevant key for music-oriented media content 406. In addition, the user identified as "Duke1632" provides information that can be relevant for a tag associated with venue. For example, while a venue is not proposed in this case that can be agreed with or disputed, it can be determined that should any other user suggest the correct venue is Albert Hall, then this particular user's input can represent a dispute of that suggested value.

In addition, user interface 410 can include and/or present to users additional elements. For example, output 514 that can display other keys or suggested values can be provided. Moreover, output 514 can provide a convenient mechanism for users to vote on which keys (as well as associated suggested values) should be included for media content 406. In this case, it is recommended that an ISMN be included as well as the composer. Such information can be useful to users when, e.g., those users are interested in making a purchase associated with this version of the underlying Bach concerto.

Figure 6:
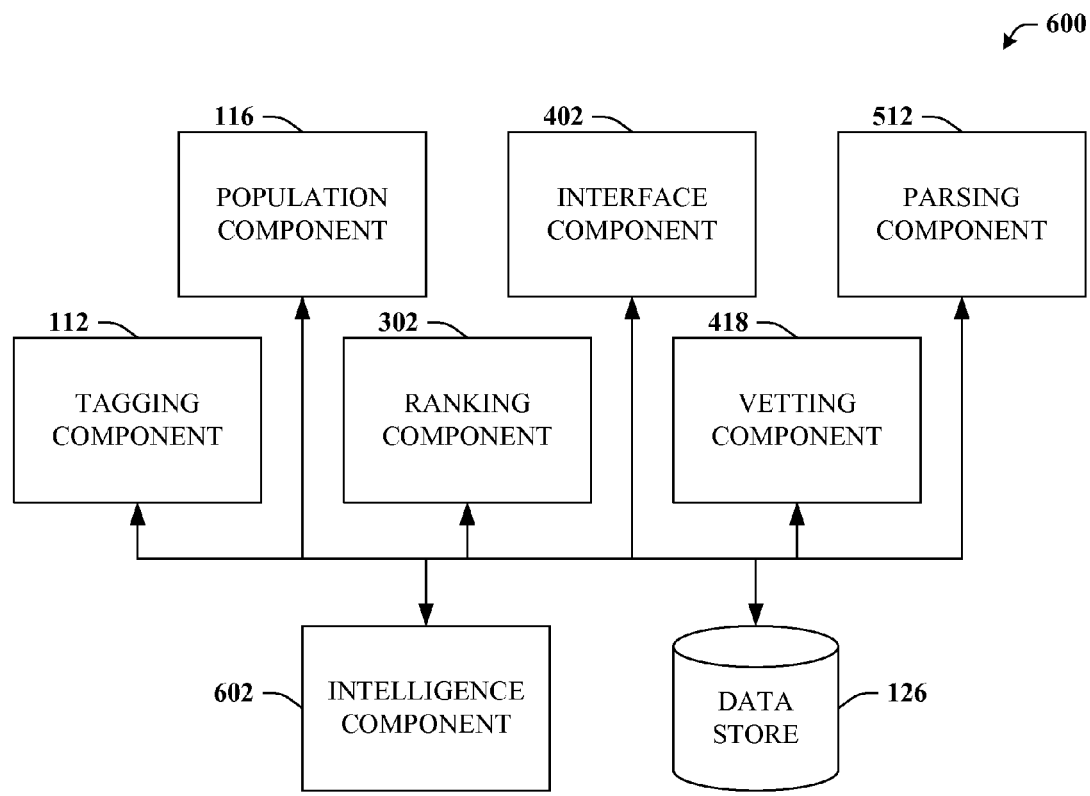
FIG. 6 illustrates a block diagram of an exemplary non-limiting system that can provide for or aid with various inferences or intelligent determinations.

Referring now to FIG. 6, system 600 that can provide for or aid with various inferences or intelligent determinations is depicted. Generally, system 600 can include all or a portion of tagging component 112, populating component 116, ranking component 302, interface component 402, vetting component 418, and parsing component 512 as substantially described herein. In addition to what has been described, the above-mentioned components can make intelligent determinations or inferences. For example, tagging component 112 can intelligently determine or infer a suitable classification 202 for certain media content 104.

Likewise, populating component 116 and/or interface component 402 can also employ intelligent determinations or inferences in connection with determining a suggested value to present, e.g., in cases in which confidence scores do not yet exist or are inconclusive. In addition, ranking component 302 and/or vetting component 418 can intelligently determine or infer the confidence metrics/scores associated with a given suggested value in view of aggregate input as well as in view of additional weighting metrics. Furthermore, parsing component 512 can intelligently determine or infer particular which user input from listing of comments 504 has relevance to the metadata. Any of the foregoing inferences can potentially be based upon, e.g., Bayesian probabilities or confidence measures or based upon machine learning techniques related to historical analysis, feedback, and/or other determinations or inferences.

In addition, system 600 can also include intelligence component 602 that can provide for or aid in various inferences or determinations. For example, all or portions of tagging component 112, populating component 116, ranking component 302, interface component 402, vetting component 418, and parsing component 512 (as well as other components described herein) can be operatively coupled to intelligence component 602. Additionally or alternatively, all or portions of intelligence component 602 can be included in one or more components described herein. Moreover, intelligence component 602 will typically have access to all or portions of data sets described herein, such as data store 126.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
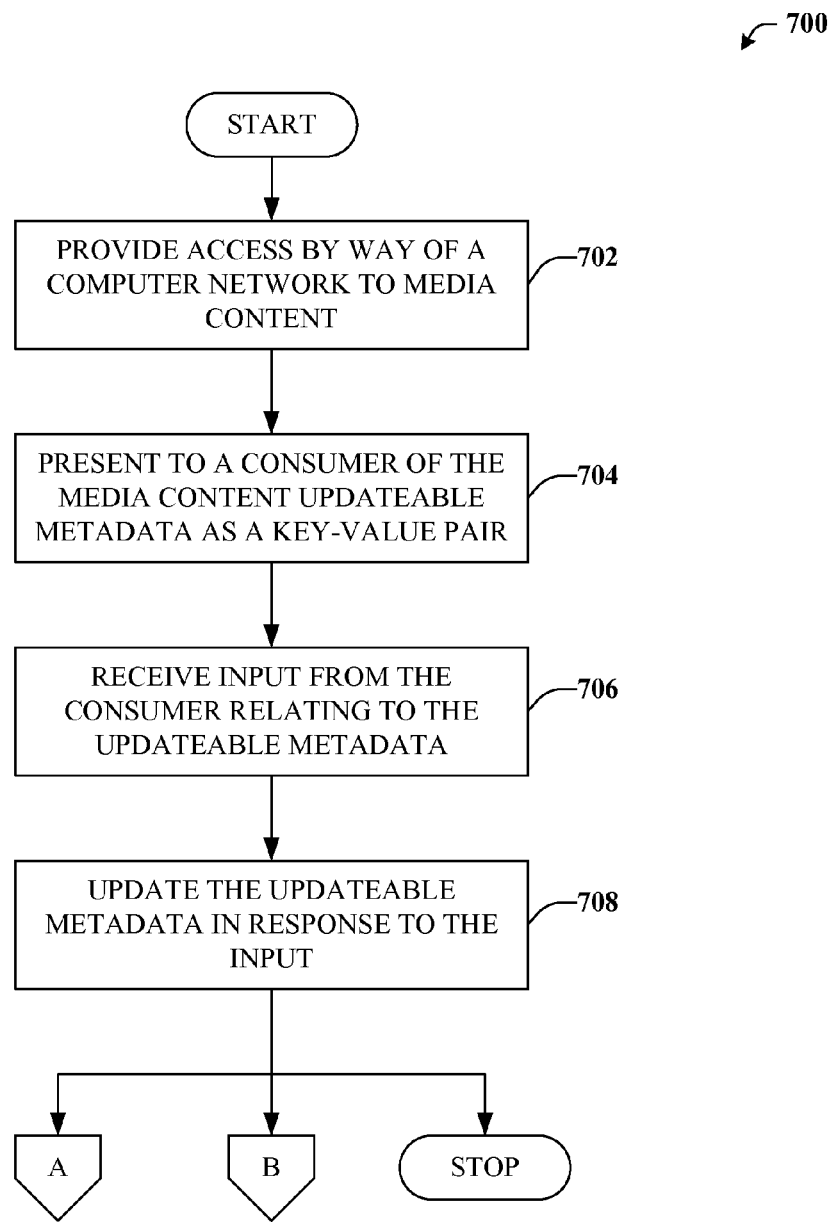
FIG. 7 is an exemplary non-limiting flow diagram for presenting and updating metadata associated with media.
Figure 8:
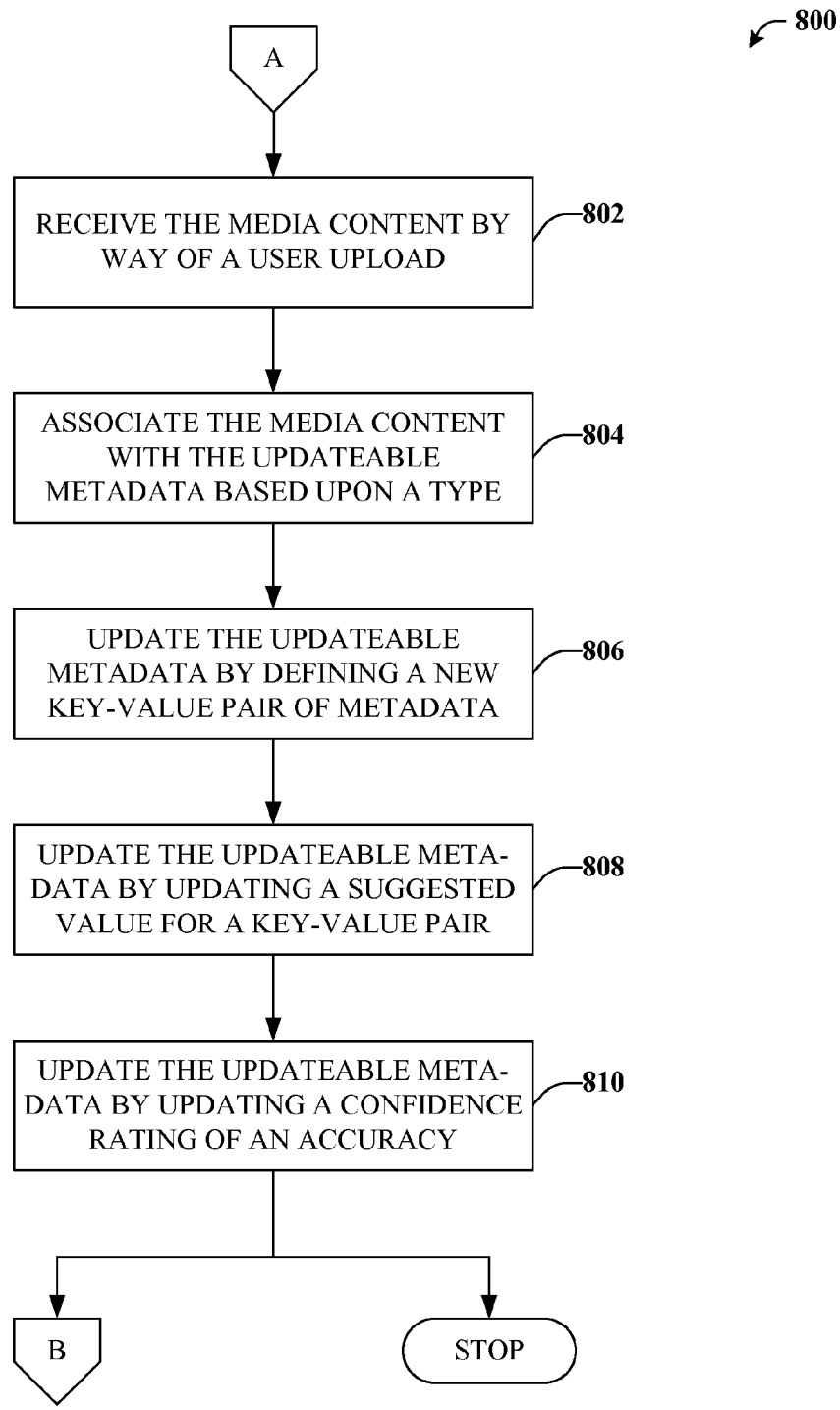
FIG. 8 is an exemplary non-limiting flow diagram for providing additional features or aspects in connection with updating media.
Figure 9:
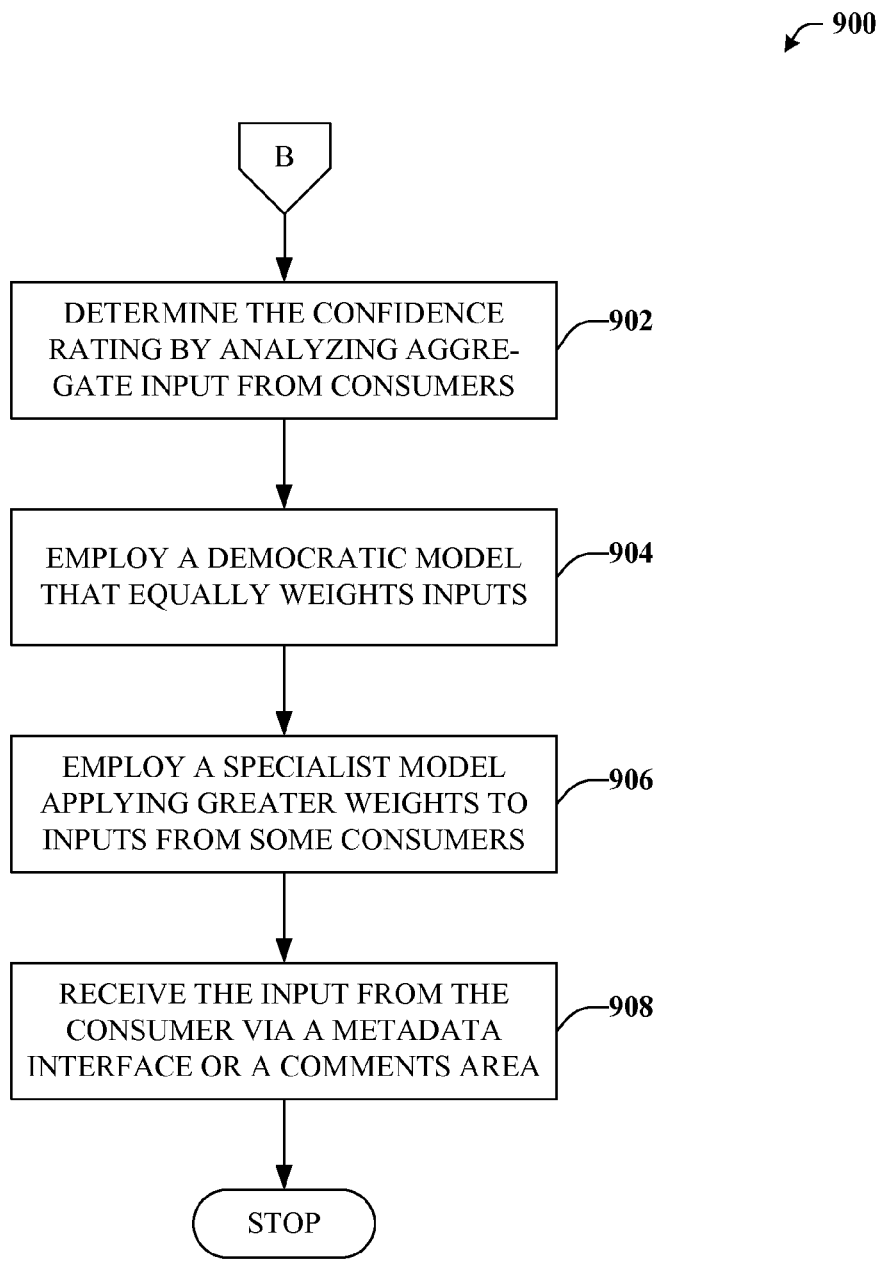
FIG. 9 is an exemplary non-limiting flow diagram for providing additional features or aspects in confidence scoring of the media.

FIGS. 7-9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers.

Referring now to FIG. 7, exemplary method 700 for presenting and updating metadata associated with media is depicted. Generally, method 700 can be accomplished by employing a processor to execute computer executable components stored within a memory to perform the following acts: At reference numeral 702, access to media content can be provided by way of a data communications network, e.g., a computer network, a mobile network, the Internet or another network.

Accordingly, at reference numeral 704, updateable metadata describing at least one feature of the media content can be presented to a consumer of the media content. In response to presentation of the media content, at reference numeral 706, input from the consumer relating to the updateable metadata can be received. This input can be, for example a suggested value for a metadata tag or a suggestion to add a new tag to an existing set of tags, which is further detailed herein. Regardless, at reference numeral 708 the updateable metadata can be updated by transforming the updateable metadata in response to the input. For example, a new tag can be added to a set of tags associated with the media content, a suggested value for a given tag can be applied, or confidence scores associated with suggested values can be updated.

Turning now to FIG. 8, exemplary method 800 for providing additional features or aspects in connection with updating media is illustrated. For example, at reference numeral 802, the media content (e.g., a Bach concerto video) can be received by way of a user upload. Hence, such media content will tend to have an unstructured set of metadata if any at all.

Furthermore, at reference numeral 804, the media content with the updateable metadata can be associated with the media content. For example, the media content can be embedded with the updateable metadata or the two can be linked according to a storage schema. Regardless, the updateable metadata can be associated with the media content based upon a type of the media content. For instance, a first type of media content can be conducive of a first set of updateable metadata, while a second type of media content can be more suitable for a second set of updateable metadata. In one aspect the set of updateable metadata for a particular type of media content can be determined based upon what is deemed to be suitable, and can be updated by users.

For example, at reference numeral 806, updating the updateable metadata detailed in connection with reference numeral 708 of FIG. 7 can be updated by defining a new category of metadata for the media content. In other words, users can suggest adding a new tag to the existing metadata for the media content. Likewise, at reference numeral 808, updating the updateable metadata detailed can comprise updating a suggested value for an existing category of the updateable metadata. For instance, metadata associated with media content might currently indicate the media content was recorded in 2005, but subsequent input by users can cause that value to change, say to 2004.

Similarly, at reference numeral 810, updating the updateable metadata detailed can comprise updating a confidence rating associated with an accuracy of the suggested value. Hence, in the brief case noted above in connection with reference numeral 808 in which the suggested value for a metadata tag relating to "date of recording" changes from 2005 to 2004, such can be in response to changes in confidence ratings for one or both of those suggested values. For example, based upon user input, the confidence rating for the suggested value of "2004" can surpass that for the suggested value "2005". Thus, the former can replace the latter as the "correct" value.

With reference now to FIG. 9, exemplary method 900 for providing additional features or aspects in confidence scoring of the media is depicted. In general, at reference numeral 902, the confidence rating introduced in connection with reference numeral 810 of FIG. 8 can be determined by analyzing aggregate input from multiple content consumers. By way of illustration, the aggregate input can include at least one of the suggested value, a vote for the suggested value, or a vote against the suggested value. Accordingly, users are free to input a new suggested value, add their assent to an existing value or record their disagreement with an existing value, irrespective of whether or not the existing value currently has a low or a high confidence rating.

In generating the confidence rating, various models can be employed. For example, at reference numeral 904 a democratic model that equally weights inputs can be employed for determining the confidence rating. In contrast, at reference numeral 906, a specialist model that applies greater weights to inputs from particular content consumers than to other consumers can be employed when determining the confidence rating. It is appreciated that the specialist model can be based upon a wide range of criteria, such as expertise, history of correct voting patterns, or the like. Moreover, the specialist model can provide granularity such that certain users are weighted more heavily even among those with expertise.

Next to be describe, at reference numeral 908, the input from the consumer that is employed for updating the updateable metadata can be received by way of at least one of an interface that present the updateable metadata or by extracting inputs from a set of comments associated with the media content.

Exemplary Networked and Distributed Environments

One of ordinary skill in the art can appreciate that the various embodiments of dynamic composition described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the smooth streaming mechanisms as described for various embodiments of the subject disclosure.

Figure 10:
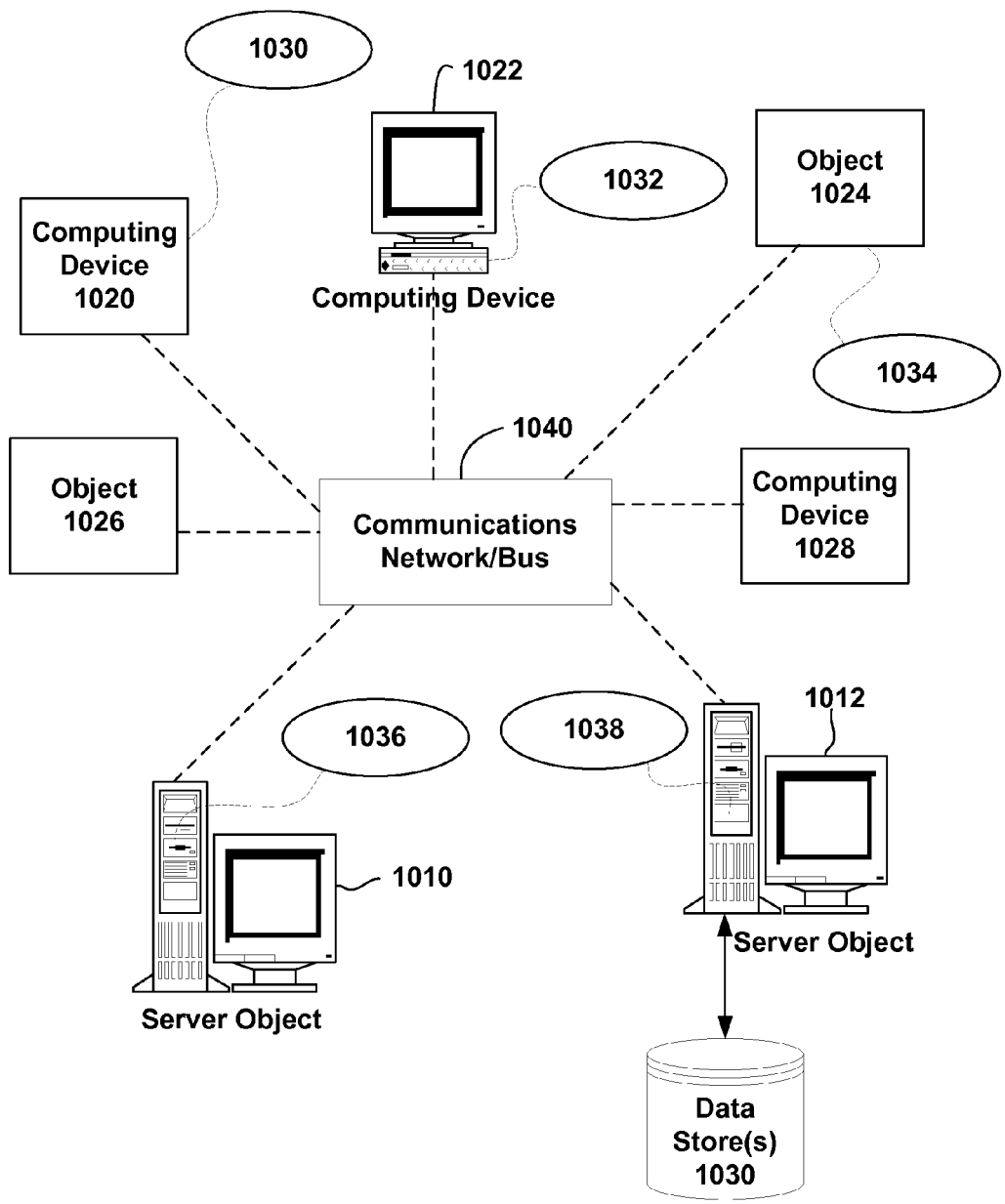
FIG. 10 is a block diagram representing an exemplary non-limiting networked environment in which the various embodiments can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc. and computing objects or devices 1020, 1022, 1024, 1026, 1028, etc. may comprise different devices, such as personal digital assistants (PDAs), audio/video devices, mobile phones, MP3 players, personal computers, laptops, tablets, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a computer process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1040 is the Internet, for example, the computing objects 1010, 1012, etc. can be Web servers with which the client computing objects or devices 1020, 1022, 1024, 1026, 1028, etc. communicate via any of a number of known protocols, such as the hypertext transfer protocol (HTTP). Objects 1010, 1012, etc. may also serve as client computing objects or devices 1020, 1022, 1024, 1026, 1028, etc., as may be characteristic of a distributed computing environment.

Exemplary Computing Device

Figure 11:
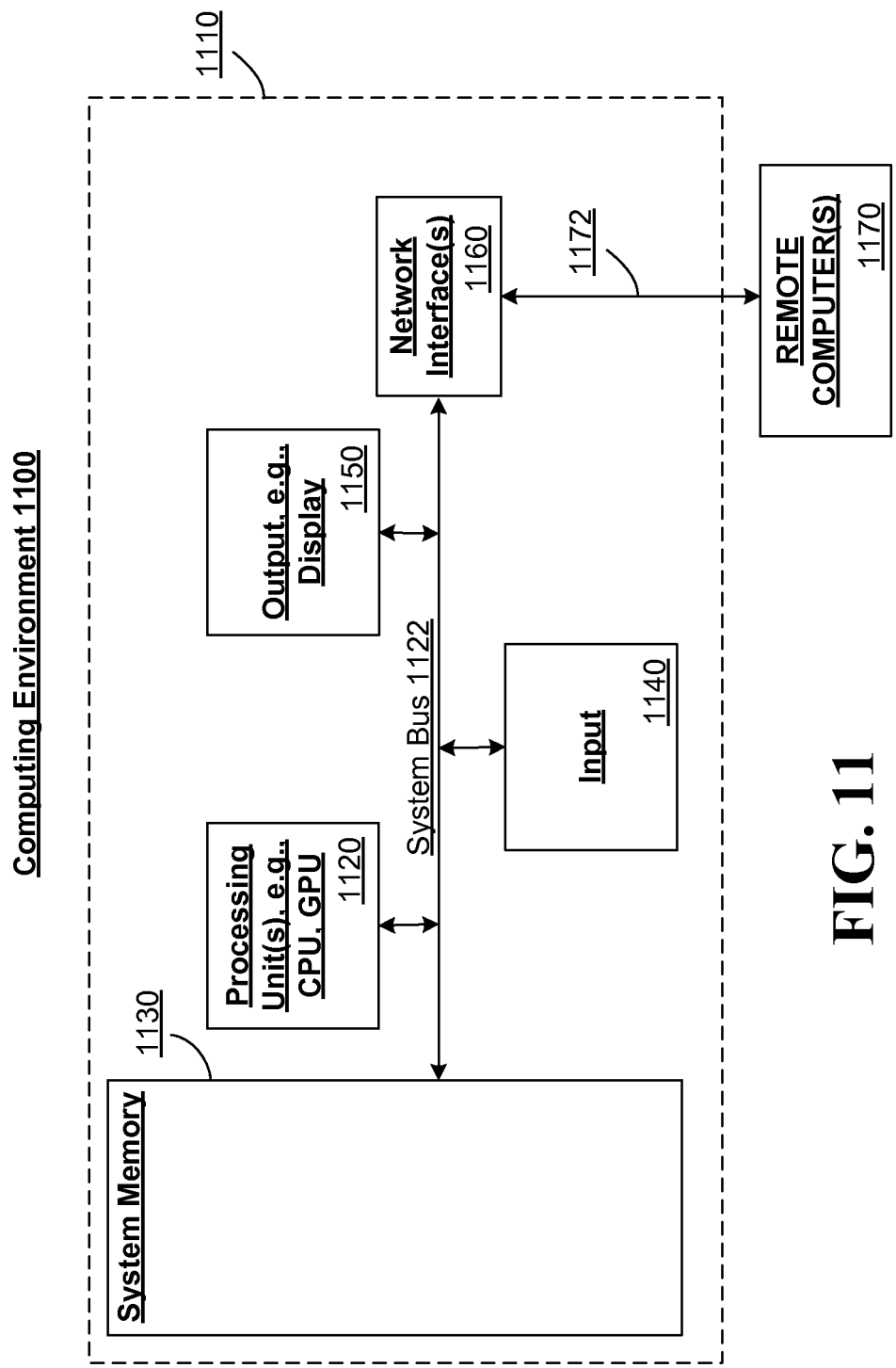
FIG. 11 is a block diagram representing an exemplary non-limiting computing system or operating environment in which the various embodiments may be implemented.

As mentioned, advantageously, the techniques described herein can be applied to any device where it is desirable to perform the described or similar implementations. It is to be understood, therefore, that handheld, portable and other computing devices and computing objects of all kinds are contemplated for use in connection with the various embodiments. Accordingly, the below general purpose remote computer described below in FIG. 11 is but one example of a computing device. Additionally, a database server can include one or more aspects of the below general purpose computer, such as a media server or consuming device, or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 be interpreted as having any dependency or requirement relating to any one or combination of components illustrated in the exemplary operating environment 1100.

With reference to FIG. 11, an exemplary remote device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system that associates metadata tags with media content, comprising:
   a non-transitory memory that stores computer executable components; and
   a processor that executes the following computer executable components stored in the non-transitory memory:
      an archive component that receives media content from a content source and stores the media content to a content server configured to provide a content consumer access to the media content;
      a tagging component that selects a set of tags that represent structured metadata that describe the media content, wherein a tag from the set of tags is implemented as a key-value pair with a key portion and a value portion, wherein the value portion of the tag relates to an updateable suggested value for the key portion, the tagging component further associates the set of tags with the media content; and
      a population component configured to update the updateable suggested value based upon input received from the content consumer and a confidence metric associated with the input.

2. The system of claim 1, wherein the key portion of the tag relates to a feature associated with the media content that is determined relevant to users.

3. The system of claim 1, wherein, the tagging component selects the set of tags based upon a classification of the media content.

4. The system of claim 1, wherein the population component updates the set of tags further based upon input received from the content source.

5. The system of claim 1, wherein the population component adds a new tag to the set of tags based upon input received from the content consumer.

6. The system of claim 1, further comprising a ranking component that determines the confidence metric associated with an accuracy of a suggested value based upon an analysis of aggregate input from multiple content consumers.

7. The system of claim 6, wherein the ranking component determines the confidence metric based upon an equal weighting of respective input from the multiple content consumers.

8. The system of claim 6, wherein the ranking component determines the confidence metric based upon an unequal weighting of respective input from the multiple content consumers.

9. The system of claim 7, wherein the ranking component increases a vote weight associated with the content consumer based upon a history of validated input.

10. The system of claim 7, wherein the ranking component decreases a vote weight associated with the content consumer based upon a history of disputed input.

11. The system of claim 7, wherein the ranking component increases a vote weight associated with the content consumer based upon relevant expertise.

12. A system that updates metadata tags associated with media content, comprising:
- a non-transitory memory that stores computer executable components; and
- a processor that executes the following computer executable components stored in the non-transitory memory:
  - an interface component that presents a tag from a set of tags associated with media content, the tag is structured as a key-value pair with a key portion and a value portion;
  - a receiving component that receives a suggested value for the value portion of the tag from a consumer of the media content; and
  - a vetting component that determines a confidence score associated with an accuracy of the suggested value and that facilitates presentation of the confidence score and a first suggested value associated with a highest confidence score.

13. The system of claim 12, wherein the tag represents structured metadata in which the key portion relates to a feature associated with the media content that is determined relevant to the consumer and the value portion is the suggested value for the key portion with the highest confidence score.

14. The system of claim 12, wherein the interface component further presents the media content and a listing of comments associated with the media content.

15. The system of claim 14, further comprising a parsing component that extracts the suggested value from the listing of comments.

16. The system of claim 12, wherein the receiving component receives the suggested value in response to a selection of metadata included in a user interface.

17. The system of claim 12, wherein the interface component presents at least one additional suggested value associated with at least one lower confidence score that is lower than the highest confidence score.

18. The system of claim 17, wherein the interface component presents the at least one additional suggested value in connection with an expandable or collapsible user interface element.

19. The system of claim 12, wherein the receiving component further receives a suggested tag that is recommended to be included in the set of tags.

20. A method for presenting and updating metadata associated with media content, comprising:
employing a processor to execute computer executable components stored within a non-transitory memory to perform the following:
- providing access by way of a computer network to media content;
- presenting to a consumer of the media content updateable metadata describing at least one feature of the media content, wherein the updateable metadata is structured as a key-value pair;
- receiving input from the consumer relating to the updateable metadata; and
- updating the updatable metadata by transforming the updateable metadata in response to the input and a confidence rating associated with an accuracy of the input.

21. The method of claim 20, further comprising receiving the media content by way of a user upload.

22. The method of claim 20, further comprising associating the media content with the updateable metadata based upon a type of the media content.

23. The method of claim 20, wherein updating the updatable metadata comprises defining a new key-value pair of metadata for the media content.

24. The method of claim 20, wherein updating the updatable metadata comprises updating a suggested value associated with a value portion of the key-value pair for an existing key-value pair of the updateable metadata.

25. The method of claim 20, further comprising determining the confidence rating by analyzing aggregate input from multiple content consumers, wherein the aggregate input includes a vote for the suggested value or a vote against the suggested value.

26. The method of claim 20, further comprising employing a democratic model that equally weights inputs for determining the confidence rating.

27. The method of claim 20, further comprising employing a specialist model that applies greater weights to inputs from particular consumers than to other consumers when determining the confidence rating.

28. The method of claim 20, further comprising receiving the input from the consumer by way of at least one of an interface that present the updateable metadata or by extracting the input from a set of comments associated with the media content.

* * * * *